(12) United States Patent
Leuschner et al.

(10) Patent No.: US 12,582,128 B2
(45) Date of Patent: Mar. 24, 2026

(54) HOLDING ELEMENT FOR POSITIONING BACK PARTS OR PARTS THEREOF OF POULTRY CARCASSES

(71) Applicant: Nordischer Maschinenbau Rud. Baader GmbH + Co. KG, Lübeck (DE)

(72) Inventors: Stephan Leuschner, Lübeck (DE); Andreas Landt, Lübeck (DE); Lasse Riggert, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 175 days.

(21) Appl. No.: 17/911,836

(22) PCT Filed: Mar. 24, 2021

(86) PCT No.: PCT/EP2021/057554
§ 371 (c)(1),
(2) Date: Sep. 15, 2022

(87) PCT Pub. No.: WO2021/191267
PCT Pub. Date: Sep. 30, 2021

(65) Prior Publication Data
US 2023/0144365 A1 May 11, 2023

(30) Foreign Application Priority Data
Mar. 27, 2020 (DE) .......................... 102020108618.0

(51) Int. Cl.
A22C 21/00 (2006.01)
A22B 5/00 (2006.01)
A22B 5/20 (2006.01)

(52) U.S. Cl.
CPC ............ *A22B 5/202* (2013.01); *A22B 5/0017* (2013.01); *A22C 21/0046* (2013.01)

(58) Field of Classification Search
CPC .... A22B 5/0017; A22B 5/202; A22C 21/0046
(Continued)

(56) References Cited

U.S. PATENT DOCUMENTS 3,104,418 A 9/1963 Segur
4,467,498 A * 8/1984 Graham ................. A22C 21/06
452/117

(Continued)

FOREIGN PATENT DOCUMENTS

CN 86103341 A 11/1987
CN 102652514 A 9/2012
(Continued)

OTHER PUBLICATIONS

Office Action from the European Patent Office dated Dec. 18, 2025 issued in related EP Application No. 21716083.7 (8 pages).

*Primary Examiner* — David J Parsley
(74) *Attorney, Agent, or Firm* — Dinsmore & Shohl LLP

(57) ABSTRACT

A holding element positions back parts or parts thereof of poultry carcasses having a neck side, a hip side, a body exterior side, and a body interior side, wherein the back part has a spinal column or parts thereof and a rib structure having at least vertebral rib pairs or parts thereof. The back part has a region, on the exterior side of the body relative to the rib structure, that has back-flesh. The holding element includes a holding device with at least one controllable clamping element. The at least one clamping element is configured and adapted to releasably fix the back part at least in some regions on the holding device by non-positive and/or positive locking engagement with the body interior side.

16 Claims, 6 Drawing Sheets

(58) Field of Classification Search
USPC .................................................. 452/165, 194
See application file for complete search history.

(56) References Cited

U.S. PATENT DOCUMENTS

| | | | | |
|---|---|---|---|---|
| 4,920,610 | A | * | 5/1990 | Callsen .............. A22C 21/0023 |
| | | | | 452/169 |
| 5,045,024 | A | * | 9/1991 | Diesing ............. A22C 21/0046 |
| | | | | 269/48.1 |
| 5,098,337 | A | | 3/1992 | Landt et al. |
| 5,269,722 | A | | 12/1993 | Diesing et al. |
| 5,299,976 | A | | 4/1994 | Meyn |
| 5,697,837 | A | | 12/1997 | Verrijp |
| 5,833,527 | A | * | 11/1998 | Hazenbroek ......... A22C 21/003 |
| | | | | 452/169 |
| 6,579,164 | B1 | * | 6/2003 | Groth ..................... A22B 5/161 |
| | | | | 452/130 |
| 8,678,887 | B2 | * | 3/2014 | Evers ................. A22C 21/0023 |
| | | | | 452/194 |
| 9,788,555 | B2 | | 10/2017 | Van Oss et al. |
| 10,154,672 | B1 | | 12/2018 | De Vos et al. |
| 2004/0132395 | A1 | | 7/2004 | Van Den Nieuwelaar et al. |
| 2012/0045980 | A1 | | 2/2012 | Landt |
| 2017/0127690 | A1 | | 5/2017 | Inoue |

FOREIGN PATENT DOCUMENTS

| | | |
|---|---|---|
| CN | 204969171 | 1/2016 |
| CN | 107509789 A | 12/2017 |
| CN | 109303103 A | 2/2019 |
| DE | 3939340 C1 | 6/1991 |
| DE | 4008719 A1 | 9/1991 |
| EP | 0207553 A1 | 1/1987 |
| EP | 0203015 B1 | 7/1990 |
| EP | 0756826 A2 | 2/1997 |
| EP | 1430780 A1 | 6/2004 |
| EP | 1169921 B1 | 5/2005 |
| EP | 1541030 A2 | 6/2005 |
| EP | 2420143 A1 | 2/2012 |
| NL | 9200538 A | 10/1993 |
| NL | 1025009 C2 | 6/2005 |
| WO | 2008078982 A1 | 7/2008 |

* cited by examiner

HOLDING ELEMENT FOR POSITIONING BACK PARTS OR PARTS THEREOF OF POULTRY CARCASSES

CROSS-REFERENCE TO RELATED APPLICATIONS

This application is the U.S. National Stage of PCT/EP2021/057554 filed on Mar. 24, 2021, which claims priority to German Patent Application 102020108618.0 filed on Mar. 27, 2020, the entire content of both are incorporated herein by reference in their entirety.

FIELD OF THE INVENTION

The invention relates to a holding element for positioning back parts or parts thereof of poultry carcasses having a neck side and a hip side as well as a body exterior side and a body interior side, wherein the back part comprises a spinal column or parts thereof and a rib structure having at least vertebral rib pairs or parts thereof, and wherein the back part comprises a region, on the exterior side of the body relative to the rib structure, that has back-flesh, which holding element comprises a holding device.

The invention relates further to an apparatus for recovering back-flesh or parts thereof from back parts or parts thereof of poultry carcasses, which apparatus comprises a holding element.

BACKGROUND OF THE INVENTION

Such holding elements and apparatuses comprising a holding element are used in the animal-processing industry, in particular in the poultry-processing industry, for holding back parts or parts thereof of poultry carcasses (also referred to generally as back parts in the following text) and in particular for supplying them to further processing devices or stations.

After the industrial slaughter of poultry, the poultry carcasses are generally processed further into smaller portions, or fileted. In the poultry-processing industry, automatic fileting of poultry carcasses has long been known. Owing to the geometric complexity of the poultry carcass, it is dissected in different process steps prior to the actual fileting in order to facilitate further processing. The most frequent intermediate products formed thereby are, firstly by means of a separating cut through the hip of the poultry body, so-called front halves, also called front side, fore-half, poultry body front half, etc., and back halves, also called back side, rear side, etc.

The front halves are essentially the upper body of the poultry. The back halves thus comprise the lower abdomen including the pelvis. The front halves may comprise the extremities of the poultry carcass, or these are removed in further upstream or downstream process steps.

In addition to the production of front halves and back halves prior to the actual fileting, front halves are frequently segmented further, since this is where there are generally the largest muscle regions of poultry. By means of a separating cut starting at the breast side of the neck along the respiratory fold, that is to say at the side of the poultry body at the ribs and through the ribs in the direction along the hip, the breast side and the back side of the poultry body front half are separated from one another. The back side thereby comprises the back part.

By separating the poultry bodies into sub-segments, the complex geometry of the poultry bodies is broken up, whereby intermediate products that are significantly easier to handle and process are obtained. The orientation of the individual segments in respect of the end products to be recovered is also taken into account in the pre-dissection of the poultry bodies. Furthermore, by cutting the poultry carcass into sub-segments, it is possible to provide suitable apparatuses and processing stations which are adapted to the particular geometries of the segments, in order to achieve the highest possible yield of desired end products.

A prominent end product is the breast muscle, or breast fillet, the massive characteristic of which dominates the upper body. The further processing of front halves has thus for a long time focused on harvesting/recovering the breast muscle, or breast fillet, with the highest possible yield efficiency, even though there are further flesh regions which can be harvested or, in light of increasing meat prices and the utilisation of the entire poultry carcasses where possible, also should be harvested.

Especially on the back side of the poultry body front half (front half) there are back-flesh regions which should not be ignored and therefore should generally also be harvested. Owing to the relatively small proportion of back-flesh compared to the total yield in the case of poultry carcasses, recovery of the back-flesh has often taken a back seat in the past.

DE 39 39 340 C1 discloses a method and an apparatus for detaching the flesh from poultry bodies. The purpose of the apparatus is to concomitantly recover the flesh located on the ribs in the region of the back during the processing of front halves. The additional recovery of the flesh located on the ribs is to take place by specially shaped and arranged cutting means. However, a complex sequence of cuts is necessary here; moreover, only a small proportion of the adhering flesh can be detached and processed further in this manner, because the flesh is only "concomitantly recovered" during processing of the front halves. Front halves are generally segmented into a breast cap and a back cap in order, for example, to recover flesh parts adhering thereto. However, if the front half is segmented further to produce a breast cap and a back cap, or also called a back part, there is no possibility of concomitantly recovering the back-flesh in the course of the recovery of the breast fillet. The back part must then be processed separately, whereby separate back-flesh recovery would have to be carried out, which in practice does not take place mechanically.

Further apparatuses and methods are known from the prior art, in which different starting products are used for the recovery of back-flesh. However, the back portions to be processed are the entire back region of the poultry carcass and not only the back parts that are obtained from a front half during production of a breast cap, for example.

WO 2008/078982 A1 discloses a method and an apparatus in which the upper back region is skinned and fileted. The starting product in this case is formed by a whole poultry carcass, in which the breast cap and the wings have already been separated off. Processing takes place while the poultry carcass part is being conveyed, suspended by the legs on a product carrier, into a processing installation. The arrangement of the poultry carcass part on the product carrier offers only low stability for engagement with cutting means provided therefor.

At present, the operation of recovering back-flesh from separated back parts is not carried out in an automated manner. In practice, the back parts obtained are further processed manually, if further processing takes place at all, in that a series of cuts is generally made along the spinal column, starting at the hip-side end of the back part, in the direction towards the neck. If the scapulae have not been removed from the back parts beforehand, there is obtained as the end product a flesh product which includes both scapulae. Such products are very popular in the fast-food industry, for example. The operation of manual separation is time-consuming and cost-intensive and frequently delivers only a low yield from the back parts. Furthermore, manual processing of the back parts involves a high risk of injury owing to the complicated sequence of cuts.

Mechanical recovery of back-flesh from back parts is not carried out at present because the positioning and holding of the back-parts on automated apparatuses is associated with a high outlay in terms of the construction and manufacture of the apparatuses, or of the holding elements, owing to the complex geometry of the back parts. However, secure fixing of the back part is necessary for the complex sequence of cuts, in order to avoid rejects. From the available apparatuses of the prior art, in particular no holding element for back parts of poultry carcasses is known that ensures secure positioning of a back part so that it is secured against undesired repositioning on engagement with cutting instruments, in order that automated recovery of back-flesh from back parts can be carried out.

SUMMARY OF THE INVENTION

Accordingly, the object of the invention is to provide a holding element for securing back parts against undesired movement, in particular during the operation of recovering back-flesh in a processing station. The object consists further in proposing a corresponding apparatus for such holding elements.

This object is achieved by the holding element having the features mentioned hereinbefore in that the holding device comprises at least one controllable clamping element, wherein the at least one clamping element is configured and adapted to releasably fix the back part at least in some regions on the holding device by non-positive and/or positive locking engagement with the body interior side.

There come into consideration as poultry carcasses in particular chickens. However, the holding element can also serve for the arrangement of back parts of other poultry, such as ducks, geese, turkeys, pigeons or quails, wherein the size dimensions of the holding element are to be adapted in each case to the dimensions of the particular back parts.

"Back parts" within the meaning of the invention is to be understood as meaning a region of the front halves of poultry carcasses which has been separated separately and is formed in particular by the back region of the poultry front halves of the poultry carcass. The back part thereby comprises in particular at least one region of the spinal column with at least one region of the ribs as well as the back-flesh connected thereto. The back-flesh preferably has at least one scapula, particularly preferably two scapulae, that is to say there is a scapula on each side of the spinal column.

The "body interior side" and the "body exterior side" within the meaning of the invention are alternatively also referred to as the internal region of the poultry, or of the back part, and as the external region of the poultry, or of the back part. The body interior side thus forms in particular the internal chamber of the thoracic cavity of the poultry with the ribs extending vertebrally to the spinal column, while the body exterior side characterises the outer region, with the skin or the flesh, which is accessible from outside.

The "neck side" and the "hip side" of the back parts are defined by the segmentation of the poultry carcass which has been carried out beforehand. The neck side of the back part is the side that is produced by a cut in the neck region of the poultry, while the hip side is produced when a cut is made in the region of the hip. The back part is thus defined by the anatomy of the poultry carcass and the segmentation thereof which has been carried out beforehand.

Within the meaning of the invention, the configuration of the at least one controllable clamping element such that it releasably fixes "the back part at least in some regions" on the holding device by non-positive and/or positive locking engagement with the body interior side means that the at least one clamping element is in operative connection with at least one region of the body interior side of the back part. Advantageously, engagement into bone regions is expedient, because such regions offer high stability for engagement with mechanical means. The clamping element preferably engages with all the exposed bone regions, such as the rib structure and/or the spinal column or parts thereof, in order to produce fixing of the back part that is as extensive as possible. "To releasably fix" within the meaning of the invention means that the back part or parts thereof can conveniently be detached from the holding element again in that the engagement of the at least one clamping element with the body interior side of the back part is reversible. For fixing the back part on the holding element, pressure is preferably applied to the back part from the exterior side in order to position the back part with the body interior side on the corresponding regions of the holding element. The optional pressure provided for this purpose can be applied, for example, manually and/or mechanically.

By means of the holding element according to the invention it is ensured that the back part to be positioned on the holding element can be releasably fixed reliably and against undesired movement. "Fixing" means in this context that, in particular in the case of an application of force to the back part, for example in the case of an application of force to the body exterior side, the entire back part is secured against a change in position. Fixing can also be understood as meaning clamping, engagement, retaining, etc. An application of force can take place, for example, by a downstream processing station, wherein, owing to the fixing, a convenient and clean cutting operation can be carried out. In this manner, it is possible to separate the back-flesh from the back part with minimal losses and without damage, which results in an increase in yield. At the same time, the holding element has a construction of low complexity and an associated reduced outlay in terms of costs in the production of such holding elements or apparatuses. The low complexity of the holding element additionally means a reduced outlay in terms of the method on positioning the back part on the holding element. The configuration of the holding element with at least one controllable clamping element is additionally advantageous, because releasable fixing of the back part on the holding element is possible in this manner. As a result of the non-positive and/or positive locking engagement of the holding device on the body interior side, the back part is secured in particular against sliding. Such non-positive and/or positive locking engagement in particular prevents sliding on application of a horizontal force to a positioned back part. The holding device is particularly advantageously configured and adapted to releasably fix the back part at least in some regions on the holding device by non-positive and/or positive locking engagement with the body interior side.

A preferred embodiment is characterised in that the at least one clamping element is configured and adapted to releasably fix the back part on the body interior side by non-positive and/or positive locking engagement at least in a part-region of the spinal column or parts thereof and/or in the region of the rib structure. That is to say, the clamping elements engage the spinal column and/or the rib structure in the region of the ribs and/or in the rib-free region. In this manner, in particular non-positive locking engagement takes place at least by the fixing to the spinal column, and the fixing of the ribs additionally provides combined positive locking engagement of the horizontally arranged back part against a horizontal application of force, because the clamping elements engage into the rib-free regions of the rib structure, which prevents sliding, for example. Alternatively, it is possible either that there is only engagement into the spinal column, without producing a positive locking connection with the rib structure, or that only an arrangement of the at least one clamping element in the free regions of the rib structure is performed, in order to produce positive locking engagement. It is thus ensured that a reliable possibility for securely positioning a back part is provided according to the intended use of the holding element. The type of fixing can additionally be dependent on the type of poultry and on the size of the particular back parts. Furthermore, downstream processing stations have an influence on the desired type of fixing of back parts on the holding elements. Advantageously, non-positive and positive locking releasable fixing of the spinal column and of the rib structure is carried out. Further preferably, the releasable fixing takes place along the entire spinal column which has remained in the back part.

An advantageous further development is distinguished in that the clamping element is adapted to releasably fix the back part on the holding element by non-positive and/or positive locking engagement with the body interior side at least substantially only by means of the clamping element. "At least substantially only by means of the clamping element" within the meaning of the invention means that fixing of the back part takes place predominantly by the clamping element. In particular there are no separate fixing means whereby the back part would additionally be held on the holding element. "With the body interior side" means that the clamping element fixes the back part, for example, only in the region of the spinal column, of the rib structure and/or in the rib-free regions. In this manner, a simple structural construction is possible, whereby the complexity and the outlay in terms of the method on positioning back parts are minimised. Furthermore, no element, such as, for example, an additional clamping means, that fixes the back part with the aid of further means is necessary.

In a further advantageous embodiment of the invention, the holding device comprises a centring element which extends at least substantially on a centre axis M of the holding element and which is so configured and adapted that the spinal column or parts thereof can be arranged therein at least in some regions by non-positive and/or positive locking engagement. "At least substantially on a centre axis M" within the meaning of the invention means either exactly on the centre axis M or approximately on the centre axis M, i.e. with a deviation relative to the centre axis M of not more than ±10°. This permits automated processing by means of potential further processing stations. A consistent and symmetrical orientation of the back parts on the holding element is ensured, which facilitates subsequent further processing and which contributes towards homogeneous processing results.

An expedient embodiment of the invention is characterised in that the at least one clamping element has at least one clamping tooth having a clamping region. The clamping tooth facilitates the dual function of non-positive and positive locking engagement in the body interior side of the back part. The clamping region is configured and adapted to be in engagement with a region of the back part, in particular with the spinal column, in order to provide non-positive locking engagement. The dimensions of the at least one clamping tooth are preferably so chosen that the clamping tooth is configured to engage in the rib-free regions of the rib structure, whereby positive locking engagement is produced. The material of the at least one clamping tooth is particularly preferably selected from the group of the stainless steels. The at least one clamping tooth is further preferably chosen, according to the back parts to be positioned, to have corresponding dimensions thereto, so that the back part is reliably secured on the holding element. Accordingly, the chosen size of the clamping tooth preferably amounts substantially to the rib-free regions of the rib structure of the back part, so as to form a positive locking engagement that is as exact as possible. In other words, the at least one clamping tooth thus has substantially the length dimensions of the ribs that are present in the back part. If the clamping teeth are chosen too wide, engagement into the rib-free regions is no longer possible, or it can lead to damage to the ribs and thus to contamination of the end product. Clamping elements that are too large, in particular clamping teeth that are too large, must thus be avoided. If damage has occurred to the spinal column and/or to the rib structure, reliable fixing of the back part on the holding element can no longer be ensured. The clamping region is preferably configured to be pointed or to taper so as to permit secure engagement with the spinal column and secure it against an undesired change in position.

A further expedient embodiment of the invention is characterised in that the holding device comprises two clamping elements arranged opposite one another, wherein each of the clamping elements is in particular in the form of a clamping crest. The clamping elements are particularly preferably symmetrical to one another, that is to say the clamping elements are located at the same height and each clamping crest is substantially symmetrical in form. The clamping crest is preferably formed in that the clamping crest comprises a plurality of clamping teeth for engaging into the rib-free regions of the rib structure. The arrangement of the clamping elements opposite one another results in a symmetrical construction of the holding element, which minimises the outlay in terms of production. Furthermore, the generally symmetrical structure of back parts, with ribs extending on both sides and opposite one another, can be fixed evenly in this manner. By means of two clamping elements arranged opposite one another, the back part, because it is fixed evenly, is secured in particular against rotation in the event of a potential application of force. The configuration of the at least one clamping element as a clamping crest represents a reliable option for the non-positive and/or positive locking fixing of the back part.

In a further advantageous embodiment of the invention, each of the clamping elements has from two to seven clamping teeth, in particular four clamping teeth, wherein the clamping teeth of the clamping elements are arranged, starting from the centre axis M of the holding element, at least substantially opposite one another. "At least substantially opposite" within the meaning of the invention means either exactly opposite or that the clamping teeth are arranged opposite one another with slight deviations, that is to say deviating by from 1 mm to 5 mm from the opposing arrangement. As a result, it is possible to fix the generally symmetrical structure of back parts, with ribs extending on both sides and opposite one another, evenly by means of the clamping elements. Further preferably, the distance of the clamping elements, or of the clamping teeth, from the centre axis M can be variable; in particular individual clamping teeth of a clamping element can be at different distances from the centre axis M.

A preferred further development of the invention is distinguished in that the clamping teeth are arranged at least substantially transverse to the centre axis M, wherein the clamping teeth extend at least substantially parallel to the rib pairs of a positionable back part. "At least substantially transverse to the centre axis M" within the meaning of the invention means arranged either transverse, that is to say at 90° to the centre axis M, or approximately transverse, that is to say with a deviation of the clamping teeth relative to the centre axis M of not more than ±10°. "At least substantially parallel" within the meaning of the invention means arranged either parallel to one another or approximately parallel, that is to say with a deviation of the clamping teeth extending parallel to the rib pairs of not more than ±10°. Because the rib pairs of poultry are generally curved, "parallel" within the meaning of the invention thus means, in simple terms, the schematic parallel arrangement next to one another. The clamping teeth arranged transverse to the centre axis M offer the possibility of providing non-positive and/or positive locking fixing of the back part by means of the at least one clamping element. The transversely extending clamping teeth additionally permit engagement into the spinal column because, at least in the case of the vertebral ribs of poultry, they generally likewise extend transverse to the spinal column. The arrangement permits a near-natural form of the holding element with respect to the anatomy of the back part, in order to provide fixing with high holding forces.

In a particularly preferred further development of the invention, the clamping teeth have the shape which corresponds to the openings between the ribs, which are also called rib spaces, spaces or rib-free regions. Further preferably, the clamping teeth are curved so as to correspond to the contour—in particular the outer contour—of the costal arches, in order to correspondingly engage in the openings. In this manner, the potential risk of damage to the back part is reduced because, owing to the openings, the ribs are not engaged, whereby damage to the back part, in particular snapping or breaking of the ribs, is avoided because the clamping teeth engage into the openings. By means of the contour and the arrangement of the clamping elements, engagement of the clamping teeth into the rib-free regions of the body interior side of the back part is ensured. Furthermore, the curved contour of the clamping teeth results in less resistance on engagement into the body interior side of the back part, which on the one hand results in a clean positioning operation and on the other hand, owing to the engagement of the clamping teeth with reduced resistance, likewise prevents damage to the back part. In addition, a better hold of the back part on the holding element is ensured in this way. Damage to the bones of the back part must be avoided, because contamination of the back-flesh to be recovered, for example with pieces of bone, is prevented in this way.

A further expedient embodiment of the invention is characterised in that each of the clamping elements having the clamping teeth is so configured that the clamping teeth correspond at least substantially to the rib-free regions of the rib structure on the body interior side of the back part. "Correspond at least substantially" within the meaning of the invention means either correspond exactly to the rib-free regions or correspond approximately to the rib-free regions, that is to say with a deviation of not more than ±10°. In this manner, the clamping elements, in particular the clamping teeth, are so configured that they engage into the natural anatomy of the back part with a precise fit, whereby reliable and secure transport by means of the holding elements is ensured, in particular in a downstream mechanical processing step.

An expedient embodiment of the invention is characterised in that at least one of the clamping elements is configured and adapted to be pivotable about a pivot axis S extending at least substantially parallel to the centre axis M in order to perform a pivot movement, wherein the clamping element can be arranged so as to be movable between a clamping position and a mounting position. "Movable" is to be understood as being in particular a rotational movement; the at least one clamping element is thus preferably configured to be rotatable between the clamping position and the mounting position. "At least substantially parallel" within the meaning of the invention means either configured and arranged parallel to one another or configured and arranged approximately in parallel, that is to say with a deviation of the pivot axis S relative to the centre axis M of not more than ±10°. The possibility of changing the at least one clamping element between the clamping position and the mounting position provides a solution for arranging and fixing back parts on the holding element reliably and in a simple manner. In the mounting position, the at least one clamping element is pivoted on the pivot axis S contrary to the centre axis M, in order to allow the back part to be mounted on the holding device. In order to fix the back part on the holding device, the at least one clamping element pivots about the pivot axis S in the direction towards the centre axis M. The clamping teeth, which preferably have the clamping element, thereby engage into the body interior side of the back part in a non-positive and/or positive locking manner, in order to releasably fix the back part on the holding element. A change from the clamping position into the mounting position is additionally possible, for example after the back-flesh has been recovered from the back part, in order to remove the back part separated from the back-flesh from the holding element. On changing from the clamping position into the mounting position, the at least one clamping element is pivotable outwards about the pivot axis S in order to release the fixing of the back part and, for example, effect subsequent removal of the back part from the holding element. The pivot movement of the at least one clamping element can take place, for example, by means of a pivot pin, forming a pivot joint, which pivotably connects the at least one clamping element and the holding element. For as even a clamping result as possible, the back part can be arranged in the mounting position preferably with the spinal column in the region of the centre axis M and can then be fixed in the clamping position by the at least one clamping element.

The at least one clamping element can preferably be locked in the mounting position, whereby precise and unimpeded mounting is facilitated.

A preferred further development of the invention is distinguished in that at least one of the clamping elements is configured and adapted to be spring loaded against the pivot movement in the clamping position by means of a spring element. In this manner, the at least one clamping element having the spring element is by default in the clamping position. In order to effect a change from the clamping position into the mounting position, the at least one clamping element, for movement into the mounting position, must actively be moved and held against the spring force of the spring element in the pivot movement. Owing to the spring loading of the at least one clamping element, the clamping element on the holding element is again in the clamping position, whereby constant fixing of a back part arranged on the holding element is ensured. In this manner, secure and reliable fixing of the back part is always ensured. The at least one spring element is in particular configured and adapted to prevent an automatic pivot movement of the at least one clamping element out of the clamping position into the mounting position. Automatic means in this context that the spring force of the spring element is chosen to be sufficiently great to prevent pivoting about the pivot axis S when the holding element is used as intended, that is to say especially when it is used with an apparatus from the poultry-processing industry, whereby a change from the clamping position into the mounting position is likewise prevented. The spring element can preferably be a strong mechanical spring, for example a (helical) tension spring; pneumatic solutions are also possible as an alternative for avoiding the change in position during the pivot movement of the at least one clamping element.

A further expedient embodiment of the invention is characterised in that at least one of the clamping elements is configured and adapted to be pivotable such that the clamping element, in the clamping position, clamps a back part arranged on the holding device by means of the clamping teeth acting on the spinal column against the spring loading, in order to releasably fix the back part on the holding device by non-positive and/or positive locking engagement. In this manner, fixing according to the invention of the back part on the holding element is obtained, in order to perform potential downstream processing of the back part and to secure it against undesirable release of the clamping elements.

According to a further preferred embodiment, the holding device comprises at least one trigger element, wherein the trigger element is in operative connection with at least one of the clamping elements such that the trigger element effects a change from the mounting position into the clamping position. The trigger element represents a possibility for permitting a convenient change of the operating positions, that is to say between the mounting position and the clamping position, of the at least one clamping element. The trigger element is preferably so configured that it can be actuated manually and/or mechanically, in particular in an automated manner.

A further expedient embodiment of the invention is characterised in that the trigger element is in engagement with at least one of the clamping elements such that the holding device is adapted so that it can be pretensioned under spring loading by means of the spring element, such that on activation of the trigger element at least one of the clamping elements can be transferred into the mounting position and on deactivation of the trigger element the clamping element can automatically be transferred into the clamping position. This allows the holding elements to be integrated into an automated process, wherein the trigger element permits control and automatic mounting and removal of back parts. The trigger element is in the form of a circular object, formed as a running wheel, so as to be in operative connection at least in some regions with a guide rail, in order to carry out guiding of the trigger element, which on actuation of the trigger element by means of the guide rail leads to a pivot movement of the at least one clamping element.

The object is also achieved by an apparatus having a holding element according to the invention, wherein the back parts can be arranged on the at least one holding element by non-positive and/or positive locking engagement.

In order to avoid repetition, reference is made in connection with the apparatus according to the invention to the advantages already outlined in detail in connection with the holding element according to the invention. These advantages apply analogously also to the apparatus according to the invention.

An advantageous further development is distinguished in that the apparatus comprises an engagement element which is configured and adapted to act together with the trigger element of the holding element in order to effect a change between the mounting position and the clamping position of the at least one clamping element. This makes it possible, for example, for the apparatus to be operated continuously in an automated manner, whereby efficient and resource-saving processing of back parts takes place. The engagement element can be in the form of a guide rail, for example, in which the trigger element can be guided at least in some regions. In order that a change of the position of the at least one clamping element takes place, the course of the guide rail is preferably such that a pivot movement of the at least one clamping element about the pivot axis S is brought about by means of the trigger element. A combination of such engagement elements with trigger elements is also known as controlled cam tracks, or cam roller tracks. Further preferably, the engagement element is in the form of a robot which carries out actuation of the trigger element.

The at least one holding element according to the invention can further preferably be arranged on a continuously revolving transport element. In this manner, efficient processing of back parts is possible. Such transport elements are particularly preferably belt-, band-, chain-, slide- and/or roller-type transport apparatuses.

BRIEF DESCRIPTION OF THE DRAWINGS

Further expedient and/or advantageous features and further developments as well as preferred apparatus subject-matter will become apparent from the description. Particularly preferred embodiments of the holding element and of the apparatus will be explained in greater detail with reference to the accompanying drawings, in which.

DETAILED DESCRIPTION OF THE INVENTION

Figure 1:
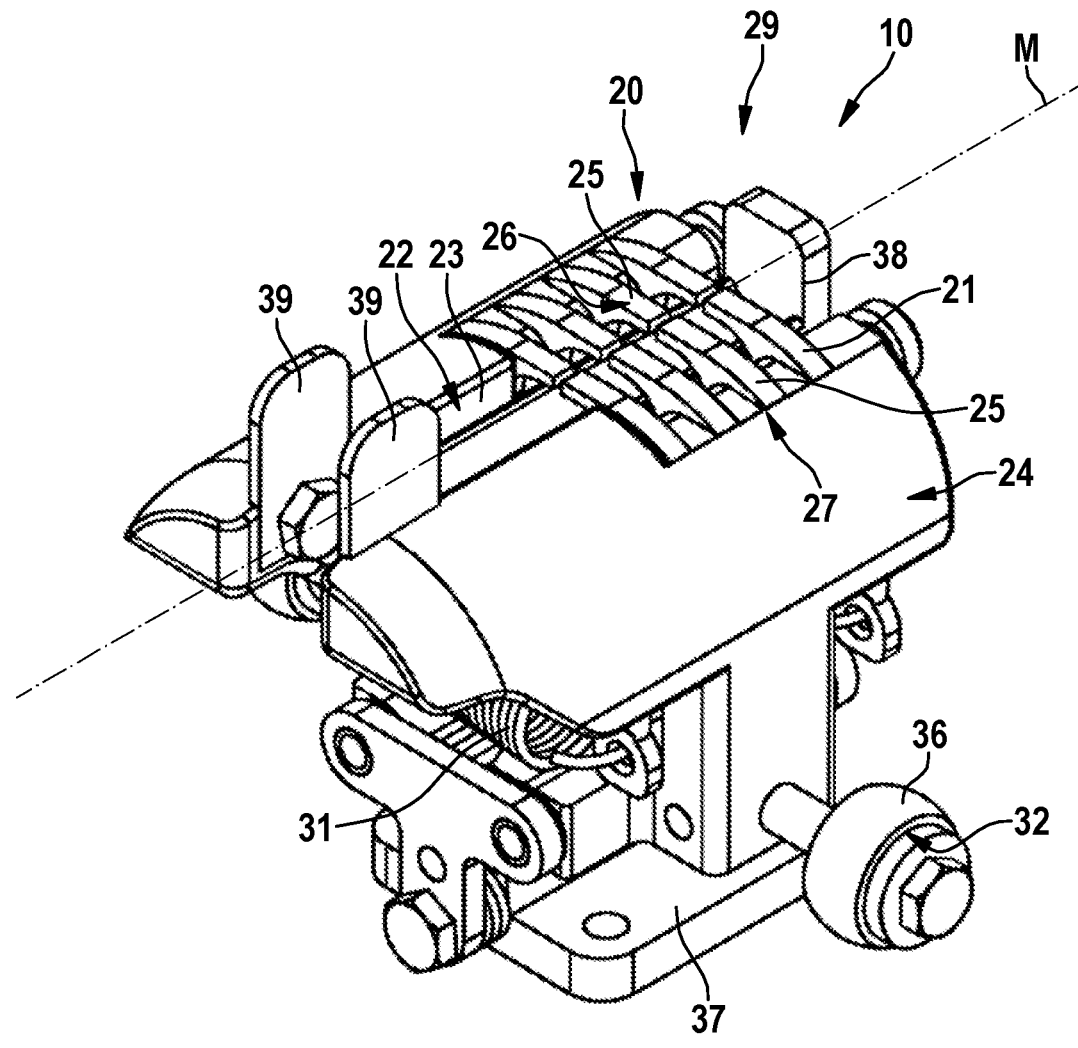
FIG. 1 is a perspective view of a holding element according to the invention in a clamping position.

The holding element according to the invention and the apparatus according to the invention will be described with reference to the above-mentioned figures. In order to avoid repetition, the comments made in relation to the holding element also apply to the apparatus according to the invention, so that in the following text comments will be made only in relation to selected aspects of the apparatus according to the invention, isolated from the holding element according to the invention.

The at least one holding element shown in the drawings is configured and adapted for positioning and releasably fixing back parts of poultry carcasses. The invention likewise relates to holding elements with which other animal bodies, comparable to the structure of back parts of poultry carcasses, are to be releasably fixed.

The holding element 10 shown is configured for positioning back parts 11 or parts thereof of poultry carcasses—not shown in the figures—having a neck side 12 and a hip side 13 as well as a body exterior side 14 and a body interior side 15, wherein the back part comprises a spinal column 16 or parts thereof and a rib structure 17 having at least vertebral rib pairs 18 or parts thereof, and wherein the back part 11 comprises a region 14, on the exterior side of the body relative to the rib structure 17, that has back-flesh 19, which holding element comprises a holding device 20.

The holding element 10 is distinguished according to the invention in that the holding device 20 comprises at least one controllable clamping element 21, wherein the at least one clamping element 21 is configured and adapted to releasably fix the back part 11 at least in some regions on the holding device 20 by non-positive and/or positive locking engagement with the body interior side 15. FIG. 1 shows the holding element 10 in a perspective view. In addition to the components mentioned above, the holding element 10 preferably comprises a base 37 for fastening to a transport element. The back part 11 can be arranged with the body interior side 15 at least in the region of the holding device 20.

Figure 4:
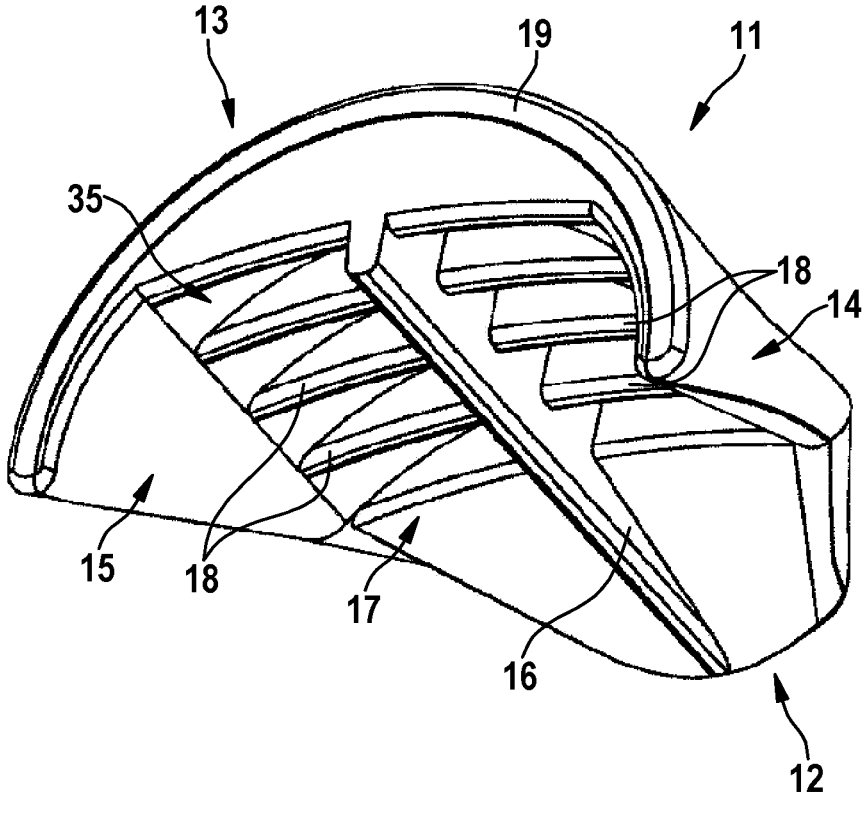
FIG. 4 is a perspective schematic view of a back part of a poultry carcass.
Figure 5:
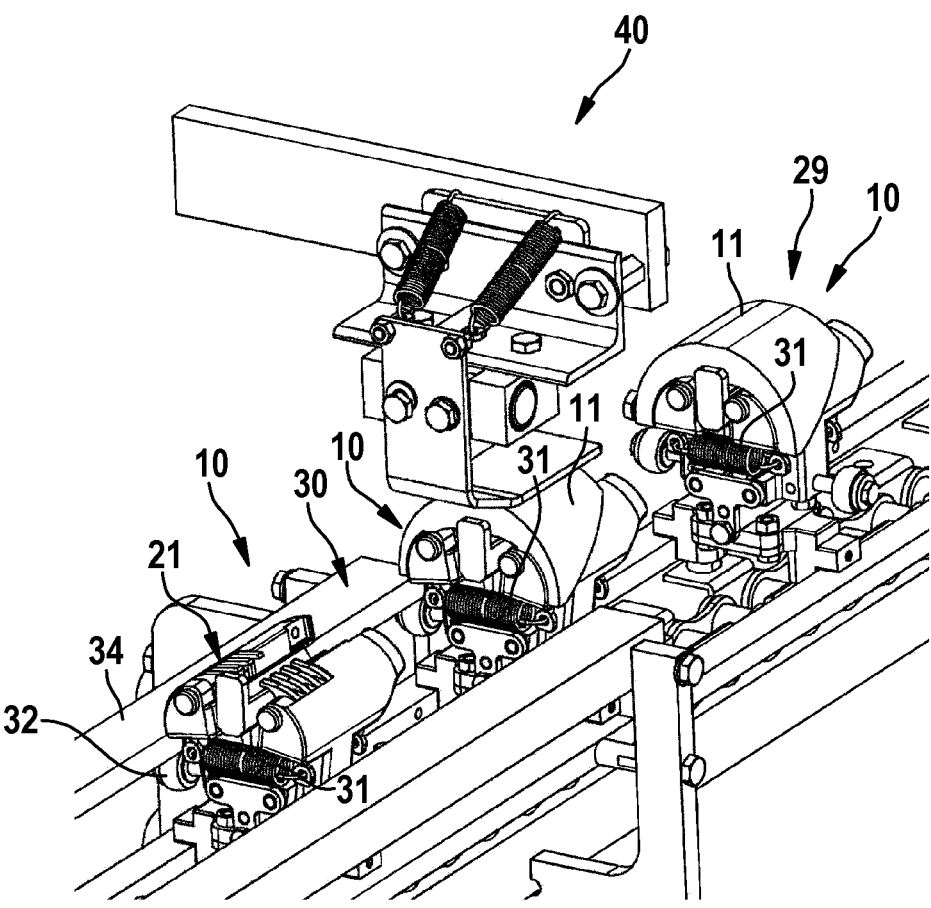
FIG. 5 shows part of an apparatus according to the invention having three holding elements on some of which back parts are arranged, according to FIG. 4.

For better understanding of the invention, the anatomy of the back parts 11 to be held by means of the at least one holding element 10 will first be described in detail in particular with reference to FIG. 4. Furthermore, back parts 11 are shown in FIG. 5 during the operation of positioning on holding elements 10. The holding element 10 according to the invention is configured and adapted in particular for the automatic or semi-automatic arrangement, positioning and fixing of back parts 11. In addition to the anatomical parts mentioned above, back parts 11 generally further comprise at least one scapula—not shown in the figures—and at least one skin layer, which forms the outermost layer of the body exterior side 14. In the present figures, the back part 11 is shown only schematically and in a highly simplified manner, without the true-to-life depiction in detail of particular anatomical features of the above-mentioned parts. The back part 11 is depicted in a simplified manner as a symmetrical body part, although natural products do not generally exhibit such symmetries. The back-flesh 19 located on the back part 11 is accessible predominantly via the body exterior side 14 and extends above the rib structure 17 and above the spinal column 16. Fixing of the back part 11 on the holding elements 10 takes place only via the body interior side 15, the body exterior side 14 is preferably not in direct contact with the holding element 10. The skeletonised region of the back part 11 comprises especially the spinal column 16 and the ribs, the ribs located in the back part 11 generally being connected to the spinal column 16. The ribs normally occur as rib pairs 18, that is to say in each case two ribs extend along the spinal column 16 substantially symmetrically to one another, so that two ribs opposite the spinal column 16 in each case form a rib pair 18. All the ribs of the back part 11, or rib pairs 18, form the rib structure 17. On the whole, the actual structure of the back part 11, that is to say how many rib pairs 18 the back part 11 comprises, is immaterial for the use according to the invention of the holding element 10, as long as an arrangement with the body interior side 15 with the holding device 20 is possible. The at least one clamping element 21 is preferably configured and arranged on the holding element 10 so as to engage and fix the back part 11 from the body interior side 15 in the region of the hip side 13, that is to say with the rib structure 17 and/or the part of the spinal column 16 located in this region.

The features and further developments and also method steps that are described in the following text represent preferred embodiments when considered alone or in combination with one another. It is explicitly pointed out that features and method steps which are combined in the description and/or the drawing or which are described in a common embodiment can also further develop the holding element 10 described above and the apparatus described below functionally independently.

As is apparent from FIG. 5, the at least one clamping element 21 is configured and adapted to releasably fix the back part 11 on the body interior side 15 at least in a part-region of the spinal column 16 or parts thereof and/or in the region of the rib structure 17 by non-positive and/or positive locking engagement. For this purpose, the clamping element 21 is further preferably adapted to releasably fix the back part 11 on the holding element 10 by non-positive and/or positive locking engagement with the body interior side 15 at least substantially only by means of the clamping element 21. The actual fixing of the back part 11 on the holding element 10 thus preferably takes place only by engagement of the holding device 20 on the body interior side 15.

Figure 2:
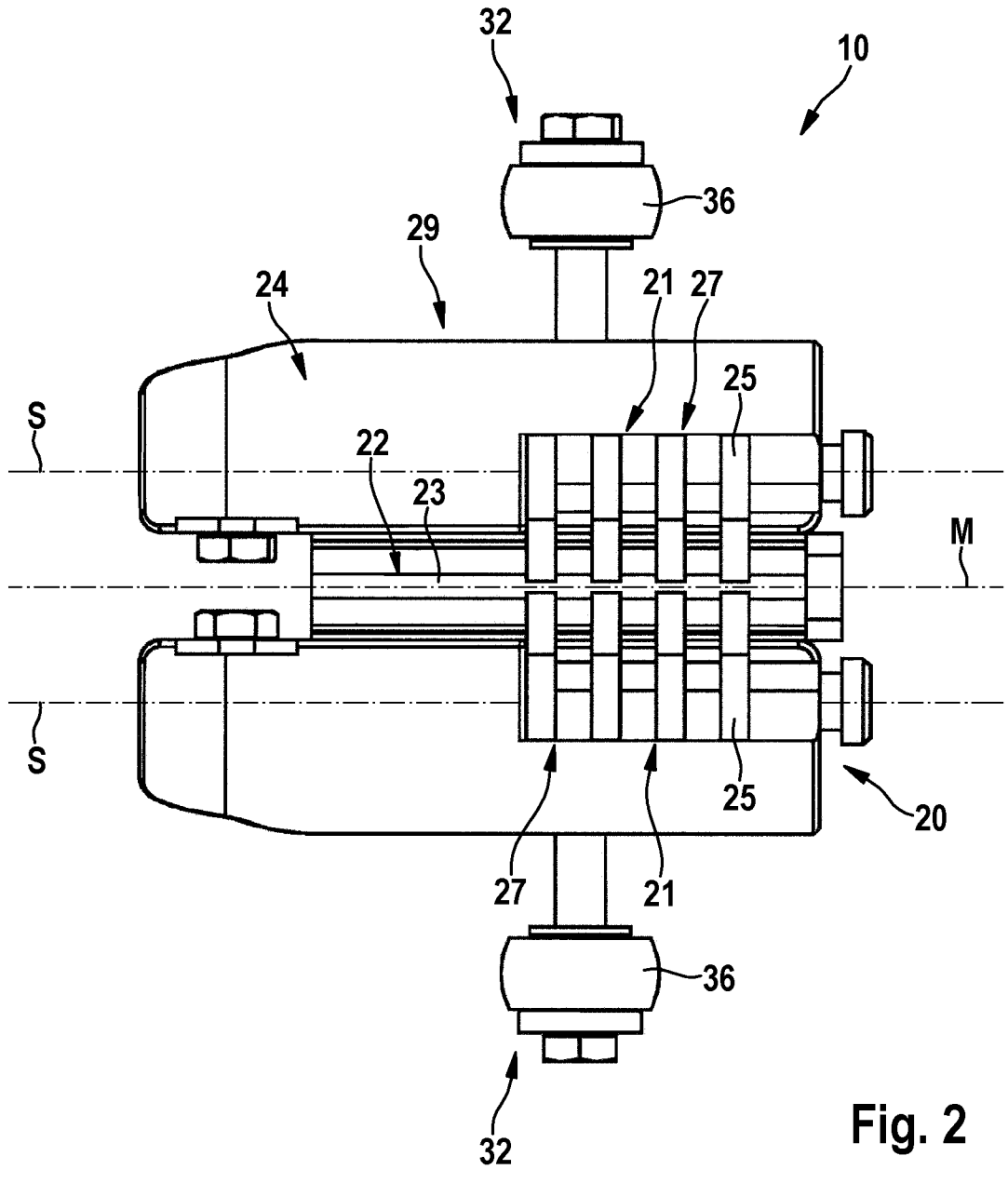
FIG. 2 is a plan view of the holding element according to the invention according to FIG. 1 in the clamping position.
Figure 3:
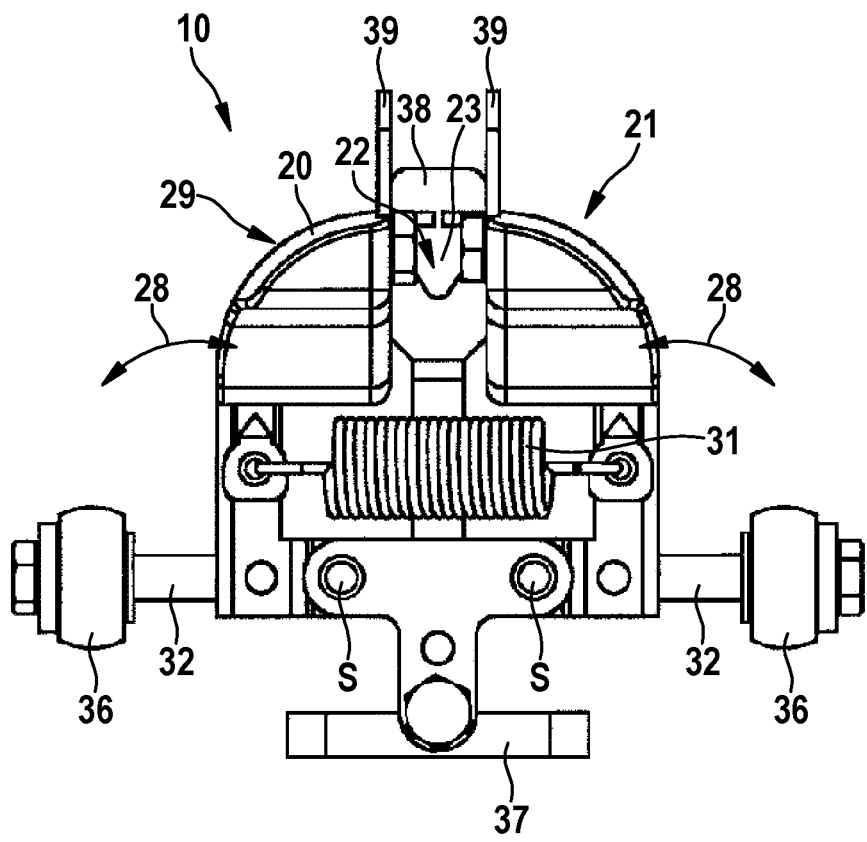
FIG. 3 is a front view of the holding element according to the invention according to FIG. 1 in the clamping position.

FIG. 1 to FIG. 3 show the holding element 10 in detail without a back part 11 mounted thereon. The holding device 20 advantageously comprises a centring element 22 which extends at least substantially on a centre axis M of the holding element 10 and which is so configured and adapted that the spinal column 16 or parts thereof can be arranged therein at least in some regions by non-positive and/or positive locking engagement. By means of the centring element 22, the back part 11 is arranged evenly on the holding element 10, which leads to consistent fixing results. The centring element 22 is in the form of a gap 23 in which the spinal column 16 is secured at least in some regions against horizontal sliding.

The back parts 11 are arranged on the outer side of the holding element 10, the saddle 24, with the body interior side 15. The holding device 20 having the at least one clamping element 21 is integrated into the region of the saddle 24. The at least one clamping element 21 has at least one clamping tooth 25 having a clamping region 26. In the holding element of FIG. 1 to FIG. 3, two clamping elements 21 with a total of four clamping teeth 25 arranged opposite one another at the centre axis M, that is to say eight clamping teeth 25, are shown. Each of the clamping elements 21 is thereby preferably in the form of a clamping crest 27. That is to say, the individual clamping teeth 25 extend preferably, as is shown in FIG. 1 and FIG. 2, substantially parallel to one another. The clamping region 26 of the clamping teeth 25 is further preferably located in the front region of the clamping teeth 25, that is to say in each case in the region facing the centre axis M. The clamping region 26 of the clamping teeth 25 is particularly preferably configured and adapted for engagement with the spinal column 16 of the back part 11.

Preferably, each of the clamping elements 21 has from two to seven clamping teeth 25, in particular four clamping teeth 25, wherein the clamping teeth 25 of the clamping elements 21 are arranged, starting from the centre axis M of the holding element 10, at least substantially opposite one another. The holding elements 10 of FIG. 1 to FIG. 3 and also FIG. 5 and FIG. 6 each have two clamping elements 21 with in each case four opposing clamping teeth 25. Furthermore, the clamping teeth 25 are advantageously arranged at least substantially transverse to the centre axis M and are distinguished in that the clamping teeth 25 extend substantially parallel to the rib pairs 18 of a positionable back part 11.

Figure 6:
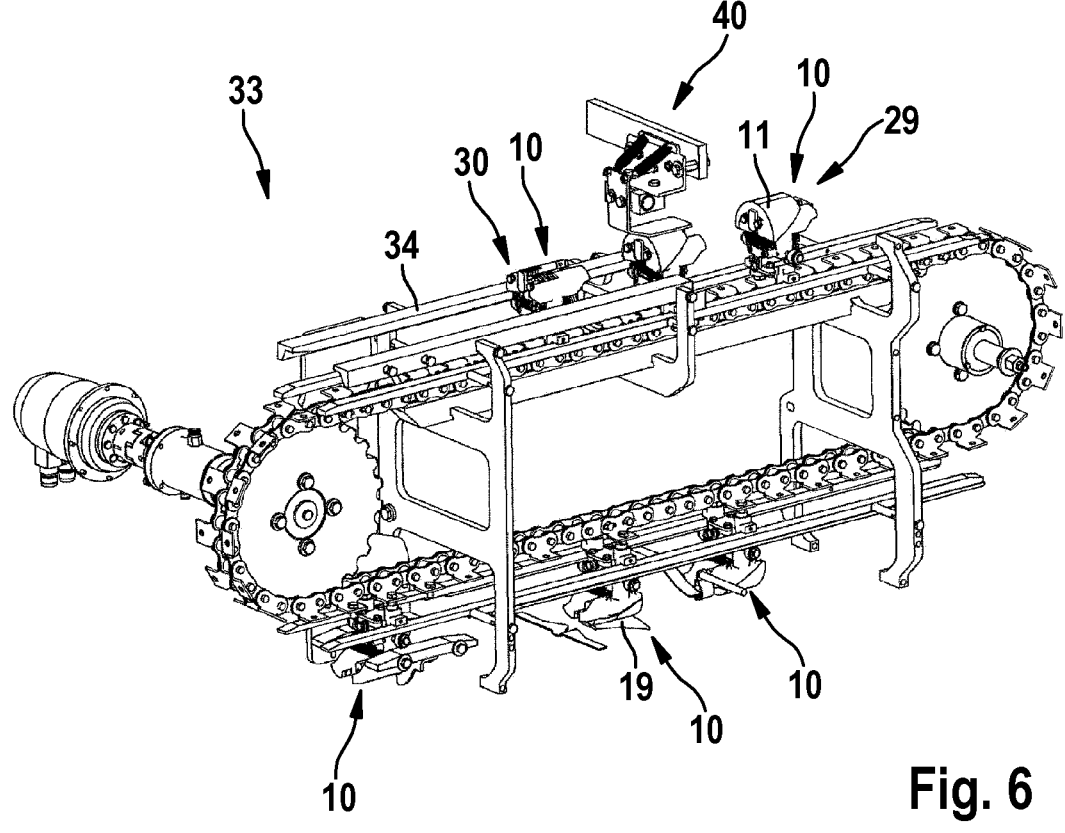
FIG. 6 is a perspective view of the apparatus according to the invention according to FIG. 5.

In FIG. 5 and FIG. 6, the operation of positioning and fixing the back part 11 on the holding element 10 is shown. FIG. 5 shows in particular that each of the clamping elements 21 having the clamping teeth 25 is so configured that the clamping teeth 25 correspond at least substantially to the rib-free regions 35 of the rib structure 17 on the body interior side 15 of the back part 11. The operation is shown in simplified form in FIG. 5 and FIG. 6. The back part 11 here lies with the body interior side 15 flush on the saddle 24 of the holding element 10, whereby the clamping teeth 25 are correspondingly able to engage into the rib-free regions 35 of the rib structure 17. By the engagement of the clamping elements 21 into the rib-free regions 35, fixing of the back part 11 on the holding element 10 takes place. The clamping teeth 25 thereby on the one hand engage into the spinal column 16, and on the other hand the clamping teeth 25 are arranged in the rib-free regions 35 between the rib pairs 18, whereby non-positive and/or positive locking fixing of the back part 11 on the holding element 10 takes place.

As is shown in FIG. 3, FIG. 5 and FIG. 6, preferably at least one of the clamping elements 21 is configured and adapted to be pivotable about a pivot axis S extending at least substantially parallel to the centre axis M, in order to perform a pivot movement 28, wherein the clamping element 21 can be arranged so as to be movable between a clamping position 29 and a mounting position 30.

As is shown in FIG. 1, the holding element 10 further preferably comprises at least one positioning element 38. The at least one positioning element 38 is configured and arranged on the upper side, in particular on the saddle 24, of the holding element 10 so as to position or orient a back part 11 arranged on the holding element 10 in a desired orientation. The positioning element 38, which is located at the outer edge in the region of the clamping elements 21, serves to position the hip side 12 of the back part 11, which by means of the positioning element 38 can be so arranged on the holding element 10 that the clamping elements 21 are able to engage exactly into the rib-free regions 35 of the rib structure 17. Further positioning elements 39 may be present, which are used for hip-side 13 positioning of the back part 11.

Further preferably, at least one of the clamping elements 21 is configured and adapted to be spring loaded by means of a spring element 31 against the pivot movement 28 in the clamping position 29. In FIG. 1, FIG. 3 and FIG. 5, the spring element 31 is in the form of a tension spring, although further forms of the spring element 31 are possible in principle. The tension spring is thereby in operative connection with the clamping elements 21, whereby the clamping elements are spring loaded towards one another in the clamping position 29. Particularly preferably, at least one of the clamping elements 21 is thereby configured and adapted to be pivotable such that the clamping element 21, in the clamping position 29, clamps a back part 11 arranged on the holding device 20 by means of the clamping teeth 25 acting on the spinal column 16 against the spring loading in order to releasably fix the back part 11 on the holding device 20 by non-positive and/or positive locking engagement.

For practical changing between the operating positions of the holding element 10, the holding device 20 preferably comprises at least one trigger element 32, wherein the trigger element 32 is in operative connection with at least one of the clamping elements 21 such that the trigger element 32 effects a change from the mounting position 30 into the clamping position 29. In FIG. 1 to FIG. 3, the trigger element 32 is in each case formed on the side of the holding element 10 as a rod-shaped prolongation. Particularly preferably, the trigger element 32 is in engagement with at least one of the clamping elements 21 such that the holding device 20 is adapted to be pretensioned under spring loading by means of the spring element 31 such that on activation of the trigger element 32 at least one of the clamping elements 21 can be transferred into the mounting position 30 and on deactivation of the trigger element 32 the clamping element 21 can automatically be transferred into the clamping position 29. In the case of the holding element 10 in the illustrated figures, activation of the trigger element 32 takes place in that the trigger element 32 is moved in the course of the pivot movement 28, wherein force that is greater than the force of the spring element 31 is applied to the trigger element 32. The application of force can thereby in principle take place in any desired way.

The apparatus 33 for recovering back-flesh 19 from back parts will be described in the following text. The apparatus is shown in FIG. 5 and FIG. 6, wherein FIG. 5 shows only the part-region in which the back parts 11 are arranged on the holding element 10. FIG. 6 shows the whole apparatus 33, not described in greater detail below, having the devices or stations for positioning, cutting and recovering back-flesh 19. The apparatus 33 comprises at least one of the holding elements 10 described above, preferably a plurality of holding elements 10, wherein the back parts 11 can be arranged on the at least one holding element 10 by non-positive and/or positive locking engagement.

The apparatus 33 preferably comprises an engagement element 34 which is configured and adapted to act together with the trigger element 32 of the holding element 10 in order to effect a change between the mounting position 30 and the clamping position 29 of the at least one clamping element 21. In FIG. 5 and FIG. 6, the engagement element 34 is shown as continuous path control, or also called cam track, in which the trigger element 32 can be guided at least in some regions, whereby the application of force for activating the trigger element 32 takes place by changing the guiding of the trigger element 32 in that the trigger element 32 is forcibly guided in the engagement element 34 by the forward movement of the holding element 10. Depending on the profile of the continuous path control of the engagement element 34, control of the engagement element 34 with the trigger element 32 can thus take place as required. For convenient guiding of the trigger element 32 in the engagement element 34, the trigger element 32 is configured with a running wheel 36 which can be guided in the engagement element 34, whereby the application of force can be transferred to the trigger element 32. In this manner, the trigger element 32 in each case allows the clamping element 21 to change between the mounting position 30 and the clamping position 29.

As is shown in FIG. 5, the apparatus 33 can further comprise a pressing device 40. The pressing device 40 is preferably arranged in the region in which the back part 11 is arranged on the holding element 10 in order to carry out pressing of the back part 11 on the holding element 10, whereby positioning takes place as required with a corresponding pressing pressure.

The invention claimed is:

1. A holding element for positioning back parts or parts thereof of poultry carcasses having a neck side, a hip side, a body exterior side, and a body interior side, wherein the back part has a spinal column or parts thereof and a rib structure having at least vertebral rib pairs or parts thereof, and wherein the back part includes a region, on the exterior side of the body relative to the rib structure, that has back-flesh, the holding element comprises:

a holding device having at least two controllable clamping elements, the at least two clamping elements being configured and adapted to releasably fix the back part at least in some regions on the holding device by non-positive and/or positive locking engagement with the body interior side, wherein two of the at least two clamping elements are arranged opposite one another relative to a centre longitudinal axis of the holding element, wherein at least one clamping element of the at least two controllable clamping elements is configured and adapted to be pivotable about a pivot axis extending parallel to the centre longitudinal axis of the holding element in order to perform a pivot movement, and wherein the at least one clamping element is arranged so as to be movable between a clamping position and a mounting position.

2. The holding element according to claim 1, wherein the at least one clamping element is configured and adapted to releasably fix the back part on the body interior side by non-positive and/or positive locking engagement at least in a part-region of the spinal column or parts thereof and/or in the region of the rib structure.

3. The holding element according to claim 1, wherein the at least one clamping element is adapted to releasably fix the back part on the holding element by non-positive and/or positive locking engagement with the body interior side at least substantially only by the clamping element.

4. The holding element according to claim 1, wherein the holding device comprises a centring element which extends at least substantially on the centre longitudinal axis of the holding element and which is configured and adapted such that the spinal column or parts thereof is arranged in the centring element at least in some regions by non-positive and/or positive locking engagement.

5. The holding element according to claim 1, wherein the at least one clamping element has at least one clamping tooth having a clamping region.

6. The holding element according to claim 1, wherein the at least one clamping element of the holding device comprises two clamping elements arranged opposite one another, wherein each of the clamping elements is in the form of a clamping crest.

7. The holding element according to claim 6, wherein each of the clamping elements has from two to seven clamping teeth, the clamping teeth of the clamping elements being arranged, starting from the centre longitudinal axis of the holding element, substantially opposite one another.

8. The holding element according to claim 7, wherein each of the clamping elements has four clamping teeth.

9. The holding element according to claim 7, wherein the clamping teeth are arranged at least substantially transverse to the centre longitudinal axis and the clamping teeth extend at least substantially parallel to the rib pairs of a positionable back part.

10. The holding element according to claim 6, wherein each of the clamping elements having the clamping teeth is configured such that the clamping teeth correspond at least substantially to rib-free regions of the rib structure on the body interior side of the back part.

11. The holding element according to claim 1, wherein at least one of the clamping elements is configured and adapted to be spring loaded against the pivot movement in the clamping position by a spring element.

12. The holding element according to claim 11, wherein at least one of the clamping elements is configured and adapted to be pivotable such that the clamping element, in the clamping position, clamps a back part arranged on the holding device by clamping teeth acting on the spinal column against the spring loading, in order to releasably fix the back part on the holding device by non-positive and/or positive locking engagement.

13. The holding element according to claim 1, wherein the holding device further comprises at least one trigger element, the trigger element being in operative connection with at least one of the clamping elements such that the trigger element effects a change from the mounting position into the clamping position.

14. The holding element according to claim 13, wherein the trigger element is in engagement with at least one of the clamping elements such that the holding device is adapted so that it is pretensioned under spring loading by a spring element, such that on activation of the trigger element at least one of the clamping elements is transferred into the mounting position and on deactivation of the trigger element the clamping element is automatically transferred into the clamping position.

15. An apparatus for recovering back-flesh or parts thereof from back parts or parts thereof of poultry carcasses, the apparatus comprises:

at least one holding element according to claim 1, wherein the back parts are arranged on the at least one holding element by non-positive and/or positive locking engagement.

16. The apparatus according to claim 15, further comprising an engagement element configured and adapted to act together with a trigger element of the holding element in order to effect a change between a mounting position and a clamping position of the at least one clamping element.

* * * * *